(12) United States Patent
Elvestad

(10) Patent No.: US 8,817,574 B2
(45) Date of Patent: Aug. 26, 2014

(54) METHOD AND SYSTEM OF A COMPOUND BUOY

(75) Inventor: Karl Petter Elvestad, Trøgstad (NO)

(73) Assignee: PGS Geophysical AS, Oslo (NO)

(*) Notice: Subject to any disclaimer, the term of this patent is extended or adjusted under 35 U.S.C. 154(b) by 278 days.

(21) Appl. No.: 13/105,380

(22) Filed: May 11, 2011

(65) Prior Publication Data
US 2012/0287751 A1 Nov. 15, 2012

(51) Int. Cl.
*B63H 25/00* (2006.01)
*G01V 1/38* (2006.01)
*B63B 21/66* (2006.01)
*B63B 35/81* (2006.01)

(52) U.S. Cl.
CPC ............... *G01V 1/3826* (2013.01); *B63B 21/66* (2013.01); *B63B 35/816* (2013.01)
USPC ............. 367/16; 367/17; 367/18; 367/20; 367/106; 114/245; 114/246; 114/253

(58) Field of Classification Search
USPC .......... 367/15–18, 20, 106; 114/25, 244–246; 441/133, 16
See application file for complete search history.

(56) References Cited

U.S. PATENT DOCUMENTS

| | | | | |
|---|---|---|---|---|
| 4,358,834 A | * | 11/1982 | Swenson | 367/4 |
| 4,831,599 A | * | 5/1989 | Dragsund et al. | 367/15 |
| 5,020,032 A | * | 5/1991 | Dale et al. | 367/4 |
| 5,532,975 A | * | 7/1996 | Elholm | 367/16 |
| 2010/0124208 A1 | * | 5/2010 | Sato | 370/336 |
| 2011/0149681 A1 | * | 6/2011 | Hovland et al. | 367/15 |

FOREIGN PATENT DOCUMENTS

EP 2 343 575 7/2011

OTHER PUBLICATIONS

Techlink (A Publication of Petroleum Geo-Services), Feb. 2008, pp. 3 and 4.
United Kingdom Search Report, mailing date: Aug. 10, 2012.

* cited by examiner

*Primary Examiner* — Isam Alsomiri
*Assistant Examiner* — Hovhannes Baghdasaryan (57) ABSTRACT

A compound buoy. At least some of the illustrative embodiments are buoy systems that include: a surface buoy; a subsurface buoy comprising an elongated outer body; a connector disposed on the lower surface; and a winch having a line, the line coupled between the surface buoy and the subsurface buoy. The buoy system has first configuration in which the upper surface of the subsurface buoy abuts the surface buoy, the abutting relationship held by tension in the line, and the buoy system has a second configuration where a distance between the surface buoy and the subsurface is limited by a length of the line spooled off the winch. In operation, the subsurface buoy supports more of the subsurface load than the surface buoy.

23 Claims, 7 Drawing Sheets

METHOD AND SYSTEM OF A COMPOUND BUOY

BACKGROUND

Marine survey systems are used to acquire data (e.g., seismic, electromagnetic) regarding Earth formations below a body of water such as a lake or ocean. The marine survey systems comprise a complex array of buoys, lines, and paravane systems in order to properly orient streamers towed behind the survey vessel.

Weather and related sea conditions may adversely affect the ability to perform a marine survey. In adverse weather conditions, the surface waves may adversely affect operation, such as by causing unwanted changes in depth of the underwater streamers, and/or inducing noise in the signals detected by the underwater streamers by way of the surface buoys associated with the streamers.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conducts and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

In the claims, adjectives that imply location shall not be read to require the location implied. For example, a buoy designated as a "submerged" buoy or "subsurface" buoy shall not be read to require that the buoy be submerged in water to fall within the scope of the claim, unless the claim expressly so recites. Similarly, a buoy designated as a "surface" buoy shall not be read to require that the buoy be at the surface of water to fall within the scope of the claim, unless the claim expressly so recites. Rather, the designations are merely to aid the reader in understanding the structural and/or physical relationships defined.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to a buoy system which may be used, for example, as a lead buoy for sensor streamers towed behind a survey vessel during a marine survey. The lead buoy may also be referred to as a dilt buoy or dilt float. More particularly, the various embodiments are directed to a buoy system comprising a surface buoy and a submerged buoy, where the submerged buoy carries the majority of the weight of the subsurface objects, and where the depth of the submerged buoy can be adjusted or changed. The specification first turns to an illustrative marine survey system, and then discusses lead buoys in accordance with various embodiments.

Figure 1:
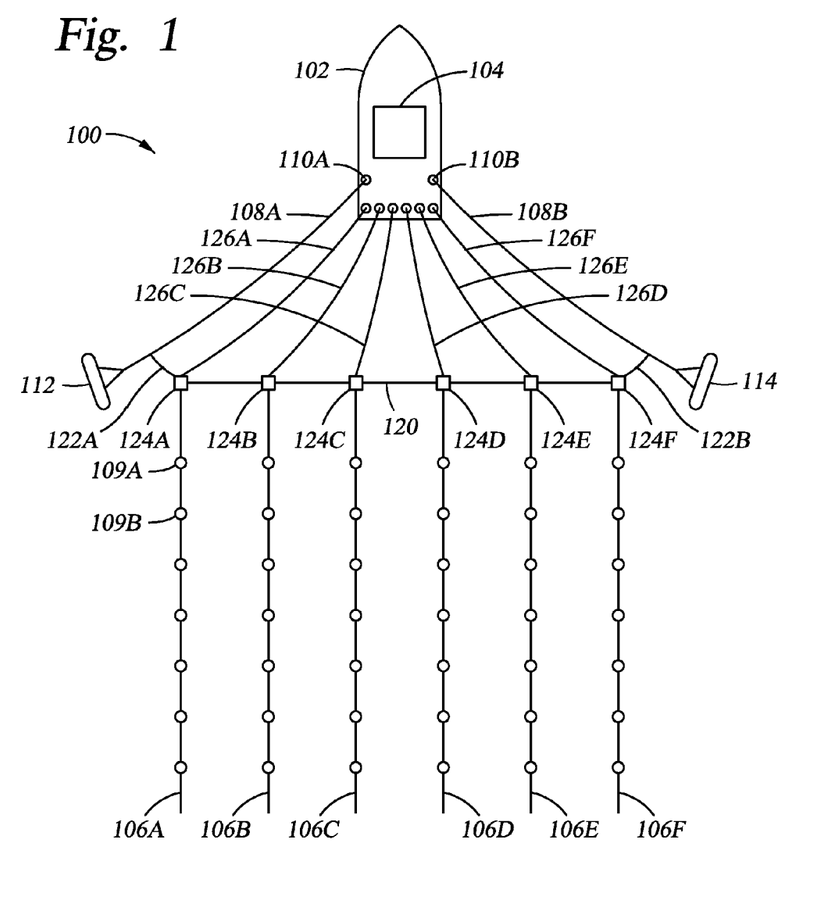
FIG. 1 shows an overhead view of a marine survey system in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B.

The streamers 106 are each coupled, at the ends nearest the vessel 102 (i.e., their proximal ends), to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

Figure 2:
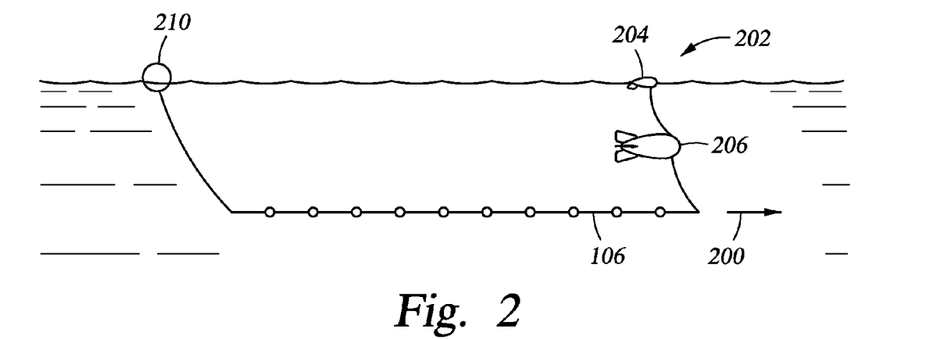
FIG. 2 shows a side elevation view of a towed streamer in accordance with at least some embodiments.

Although not shown in FIG. 1, each streamer 106A-F may be associated with one or more buoys. FIG. 2 shows an elevation side view of a streamer 106 in an operational configuration. In particular, FIG. 2 shows a streamer 106 being towed in a direction indicated by arrow 200, along with a lead buoy system 202, and tail buoy 210. The tail buoy 210, if present, may support the distal end of the streamer, and/or may designate the end of the streamer for identification purposes. In the various embodiments, the forward portion of the streamer is associated with a lead buoy system 202, where lead buoy system 202 comprises surface buoy 204 and submerged buoy 206. The lead buoy system 202 supports the weight of the subsurface load, such as the spreader cable(s) (not visible), lead-in lines (not visible) for the streamers 106, as well as the load (if any) presented by the sensor streamer 106.

However, being mechanically coupled to the streamer 106, the lead buoy system 202 may impart unwanted motion to the streamer 106, particularly in choppy seas. Such unwanted motion may result in noise in the signals detected by the sensors of the streamers, and/or unwanted changes in depth. In order to reduce the amount of motion in the streamer 106 induced by the lead buoy system 202, the lead buoy system 202 is configured to operate as a split or compound buoy. Operating the lead buoy system as a compound buoy may impart less unwanted motion to the streamer 106.

Figure 3:
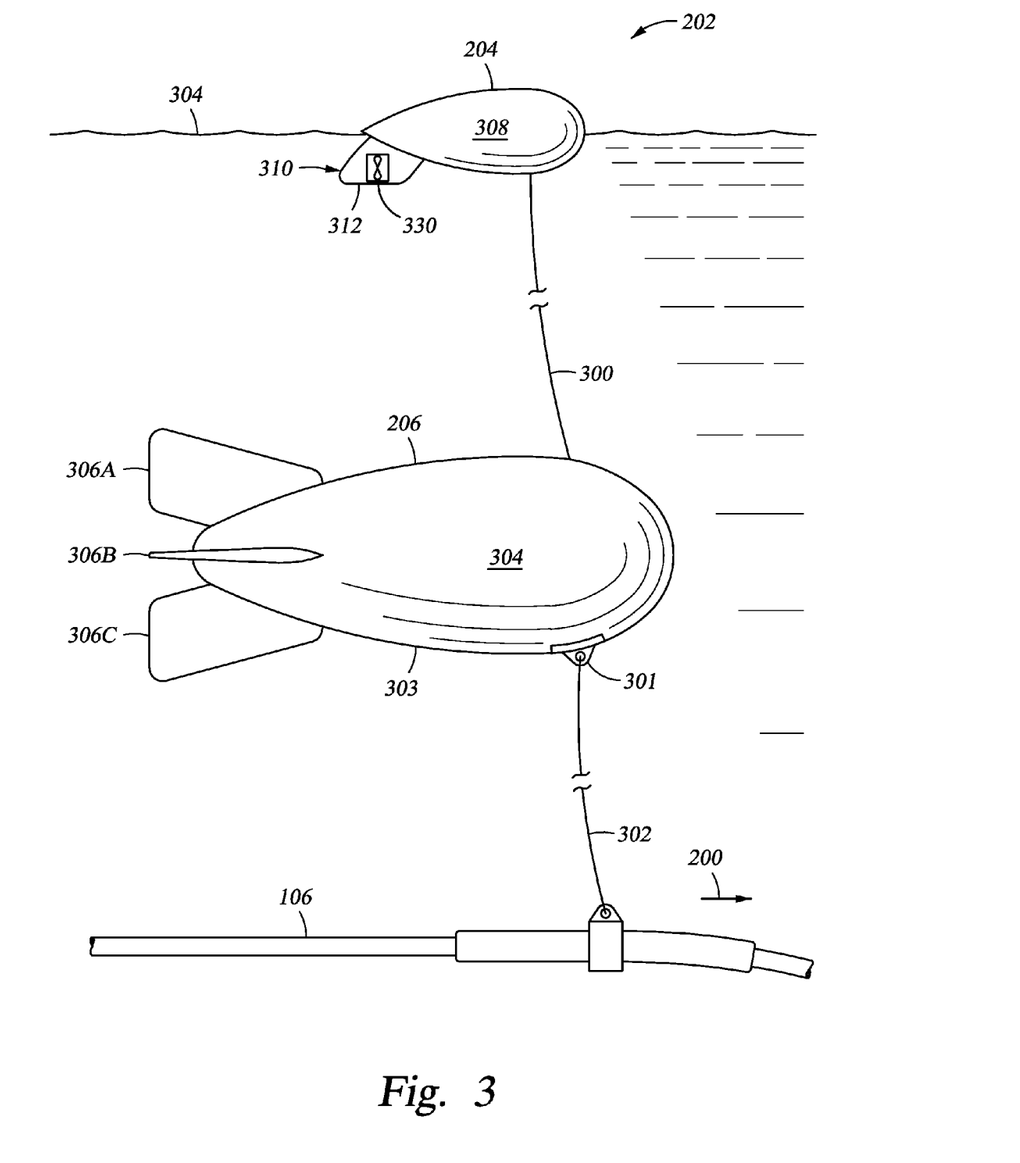
FIG. 3 shows a side elevation view of a buoy system in accordance with at least some embodiments.

FIG. 3 shows a side elevation view of a lead buoy system 202 in accordance with at least some embodiments. In particular, lead buoy system 202 comprises the surface buoy 204 and submerged buoy 206. The surface buoy 204 couples to the submerged buoy 206 by way of a line 300. Several arrangements for the coupling of the line between the surface buoy 204 and the submerged buoy 206 are discussed below. The buoy system 202 couples to the subsurface load by way of line 302 coupled to a connector 301 (e.g., a steel eyelet) on a bottom surface 303 of the buoy 206. In some marine surveys, the streamer 106 resides between 6 and 10 meters below the surface 304 of the water, and thus the combined length of the lines 300 and 302 may be between 6 and 10 meters. More shallow and deeper depths are also contemplated. In operation, the depth of the submerged buoy 206 may be anywhere from just below the surface buoy 204 to just above the sensor streamer 106; however, in order to reduce mechanical motion imparted to the streamer 106 the submerged buoy 206 in some cases resides below expected surface chop. Moreover, as discussed more below, the buoy system 202 enables selectively setting the depth of the streamer 106 by changing length of the line 300.

The buoy system 202 is configured to carry a subsurface load, illustrated by streamer 106, but with the understanding the load may come from a variety of subsurface equipment (such as the sensor streamer, the spreader cable 120, and lead in lines 126). The displacement of each of the buoys is designed and constructed such that the majority of the subsurface load is supported by the submerged buoy 206, and the balance is supported by the surface buoy 204. It follows that the submerged displacement of the submerged buoy 206 is greater than the expected displacement of the surface buoy 204 for the expected subsurface load, and in a particular embodiment the total submerged displacement of the submerged buoy 206 is greater than the total displacement of surface buoy 204. As an example, the total submerged displacement of the subsurface buoy 206 may be designed and constructed to carry at least 75% of the expected subsurface load, with the surface buoy 204 designed and constructed to carry the balance. In another example, the total submerged displacement of the submerged buoy 206 may be designed and constructed to carry 85% or more of the expected subsurface load. Having the subsurface buoy 206 carry more of the load may result in less mechanical motion being imparted to the streamers. That is, a subsurface buoy 206 may be less affected by surface waves (sometimes referred to as "chop"), thus less of the mechanical motion imparted to the buoy 206, and thus less mechanical motion (or noise) may be conveyed to the streamer 106.

In some embodiments, the buoy system 202 is designed and constructed to carry a particular subsurface load, whose weight is known in advance. In other cases, the buoy system 202 may carry a range of differing subsurface loads. In cases where the precise subsurface load is not known at the time of construction of the buoy system 202, the amount of buoyancy may be adjusted. For example, when less buoyancy is needed than can be provided by the buoy system, the buoyancy of the surface buoy 204 and/or the submerged buoy 206 may be adjusted. Adjusting the buoyancy may take any suitable form, such as adding or removing ballast to the buoys. For example, flooding internal chambers of one or both buoys, or adding steel within the internal volume of one or both buoys, could decrease the amount of buoyant force provided. By contrast, removing water or other ballast from internal volume of one or both buoys could increase the amount of buoyant force provided.

In accordance with at least some embodiments, in order to reduce the drag induced by the submerged buoy 206, the buoy 206 has a streamlined shape in the form of an elongated outer body 304, with the elongation in the direction of travel 200. As illustrated, the elongated outer body 304 has a circular cross-section at any particular location, with the largest diameter being in the forward third of the elongated outer body 304. The illustrative shape of the submerged buoy 206 of FIG. 3 may be referred to as a "torpedo" shape; however, other cross-sectional shapes may be used. The submerged buoy 206 may further comprise one or more fins 306A-C (a fourth fin not visible in FIG. 3), but any number of fins may be used. The fins 306 may provide further directional stability for the buoy 206 and thus the streamer 106 supported thereby. Other configurations are possible, such as the torpedo shape without fins towed in the opposite direction (largest diameter situated in the aft third of the buoy), and, particularly for slower expected towing speeds, non-streamlined shapes such as round. The submerged buoy 206 may be of any suitable construction, such as plastic, steel, carbon composite, fiberglass, wood frame covered with fiberglass, or combinations.

Still referring to FIG. 3, the surface buoy 204 may take any suitable shape. As illustrated, in order to reduce the drag induced by the portion of the surface buoy 204 in contact with the water, at least the submerged portion of the surface buoy 204 has a streamlined shape in the form of an elongated outer body 308, with the elongation in the direction of travel 200. As illustrated, the elongated outer body 308 has a circular cross-section at any particular location; however, other shapes may be used. For portions of the surface buoy above the expected water line the streamlined shape need not be maintained. The surface buoy 204 may further comprise rudder system 310 that may be composed of one or more fins 312. The rudder system 310 may provide directional stability for the surface buoy 204, and also form the location for electrical generator 330. The surface buoy 204 may be of any suitable construction, such as plastic, steel, carbon composite, fiberglass, wood frame covered with fiberglass, or combinations.

Figure 4:
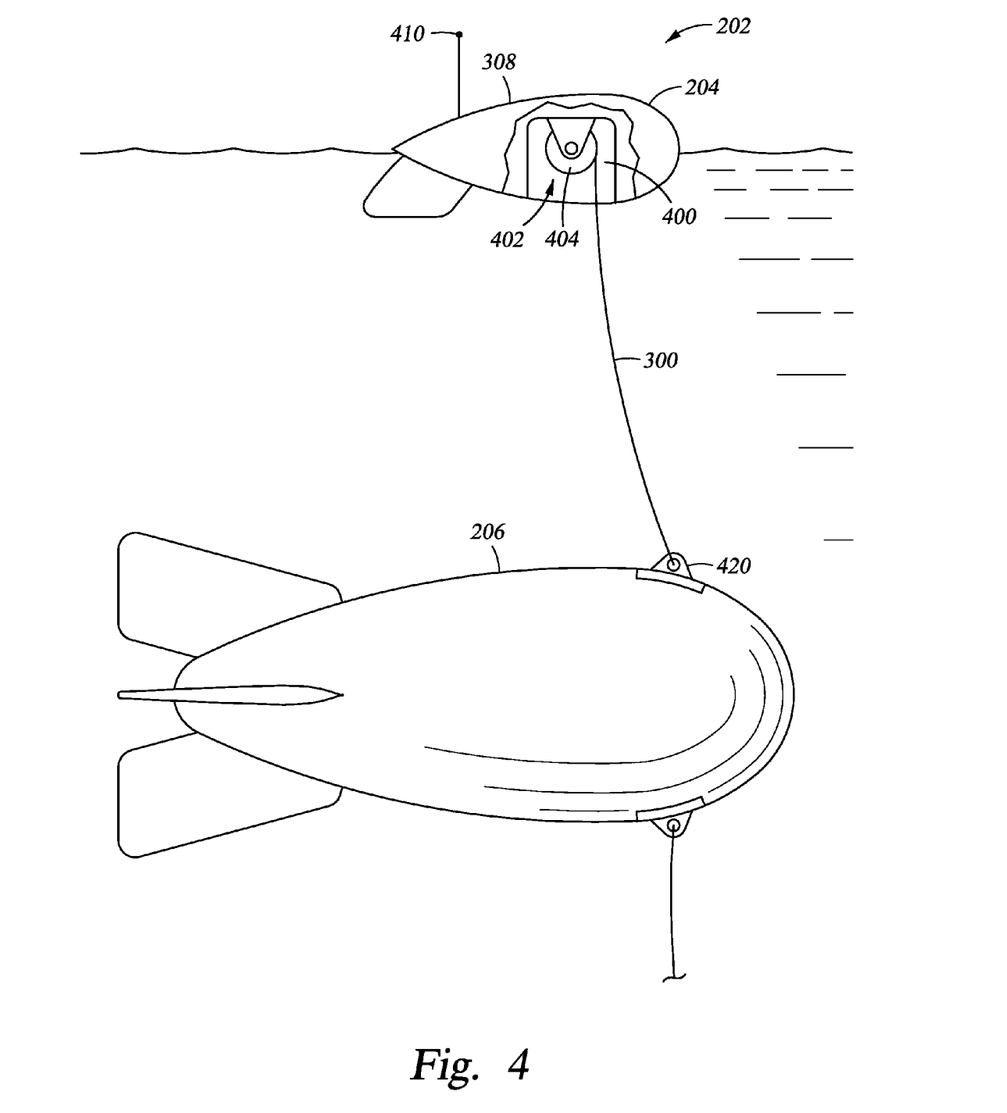
FIG. 4 shows a side elevation, partial cut-away view, of a buoy system in accordance with at least some embodiments.

As mentioned above, in accordance with the various embodiments the distance between the surface buoy 204 and the submerged buoy 206 may be changed or selectively set during use. FIG. 4 shows an elevation side view of the buoy system 202, with partial cut away of the surface buoy 204, in order to further explain illustrative embodiments. In particular, in order to selectively set the depth of the streamer, in a particular embodiment the surface buoy 204 defines a cavity 400 within the elongated outer body 308. Within the cavity 400 resides a winch 402 having line 300 wrapped around a spool 404. The line 300 couples to the submerged buoy by way of a connector 420 (such as an eyelet) on the upper surface of the submerged buoy 206. The winch 402 selectively controls the length of the line 300 coupled between the surface buoy 204 and the submerged buoy 206. However, the winch 402 need not be sized to carry the entire subsurface load. That is, because of the load carrying distribution between the submerged buoy 206 and the surface buoy 204, the winch may be of significantly smaller size than a winch designed to support the entire subsurface load. A smaller winch results in lower cost, and less displacement of the surface buoy 204 used to support the winch.

While in some cases the winch is manually operated, in other cases the winch is electrically operated. In particular, in some cases the surface buoy 204 comprises an electromagnetic communication system, illustrated by antenna 410 (and discussed more below in relation to FIG. 8). By way of the electromagnetic communication system, the winch 402 may be remotely controlled, such as remotely controlled from a surface vessel (e.g., vessel 102). Stated otherwise, the surface buoy 204 is configured to control the winch (and therefore the length of the line 300) based on messages received by the electromagnetic communication system.

Having a winch with a line coupled between the surface buoy 204 and the subsurface buoy 206 also enables a configuration of the buoy system 202 that reduces complexity during deployment and retrieval of the buoy system 202 in a marine environment. That is, the illustrative winch 402 enables not only a configuration where the distance between the surface buoy 204 and the submerged buoy 206 is limited by the length of line deployed from the winch, but also enables a configuration where the surface buoy 204 abuts submerged buoy 206.

Figure 5:
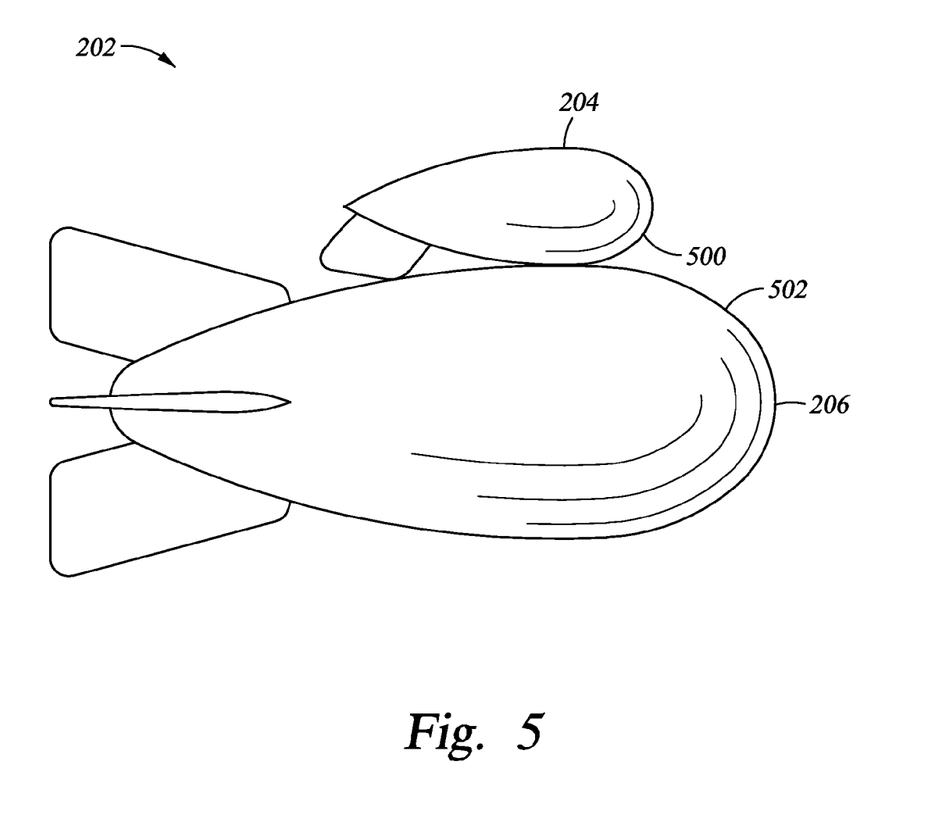
FIG. 5 shows a side elevation view of a buoy system in an abutting relationship in accordance with at least some embodiments.

FIG. 5 shows a side elevation view of the buoy system 202 in an abutting configuration. In particular, the surface buoy 204 defines a lower surface 500, and the submerged buoy 206 defines an upper surface 502. In the abutting configuration, the winch draws the line 300 coupled between the buoys onto the spool until the upper surface 502 of the submerged buoy 206 abuts the lower surface 500 of the surface buoy, and further provides a tensioning force to hold the buoys in the abutting relationship. The abutting relationship may be useful in a variety of situations. For example, the abutting relationship may represent the more shallow towing configuration for a streamer associated with the buoy system 202. Moreover, the buoy system 202 with the buoys in an abutting relationship may be the relationship whereby the buoy system 202 is deployed (i.e., moved from the deck of a vessel to the water), or retrieved (i.e., moved from the water to the deck of a vessel). By having the buoy system 202 in an abutting relationship for deployment and retrieval, the buoy system 202 acts as a single unit, rather than as two buoys coupled by a line.

Figures 6, 7:
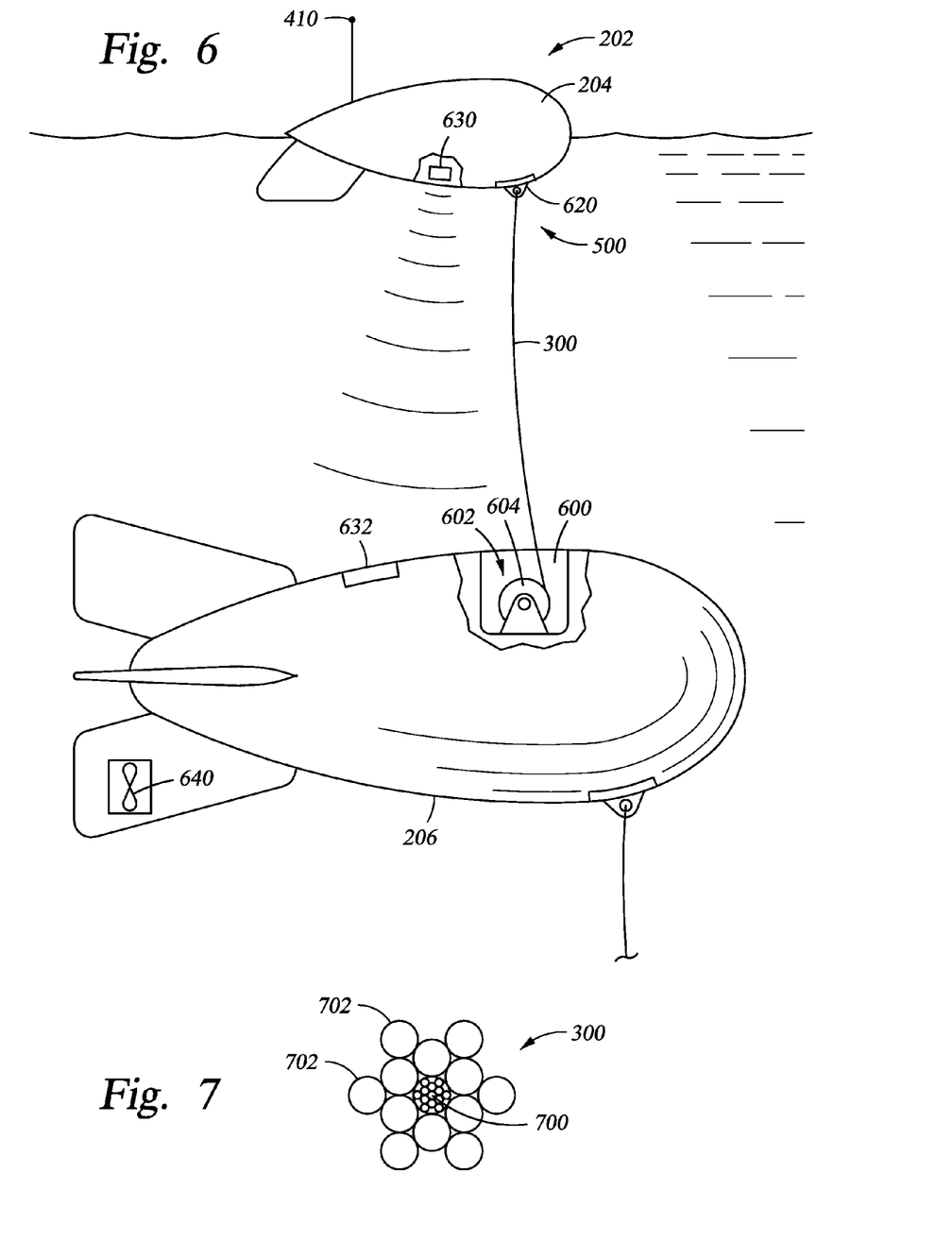
FIG. 6 shows a side elevation, partial cut-away view, of a buoy system in accordance with at least some embodiments.
FIG. 7 shows a cross-sectional view of a line in accordance with at least some embodiments.

FIG. 6 shows a side elevation view of a buoy system 202 in accordance with another embodiment. In particular, in order to selectively set the depth of the streamer in these embodiments, the submerged buoy 206 defines a cavity 600 within the elongated outer body 304. Within the cavity 600 resides a winch 602 having line 300 wrapped around a spool 604. The line 300 couples to the surface buoy by way of a connector 620 (such as an eyelet) on the lower surface 500 of the surface buoy 204. The winch 602 selectively controls the length of the line 300 coupled between the surface buoy 204 and the submerged buoy 206.

While in some cases the winch is manually operated, in other cases the winch is remotely operated. In particular, in some cases the surface buoy 204 comprises an electromagnetic communication system, illustrated by antenna 410. By way of the electromagnetic communication system, the surface buoy 204 receives instructions to control the winch 402, such as instructions from a surface vessel (e.g., vessel 102). The surface buoy 204 relays the instructions regarding winch operation to the submerged buoy 206. In some cases, the surface buoy 204 comprises an acoustic transmitter 630 in operational relationship to the water. By way of the acoustic transmitter, the surface buoy 204 transmits commands to the submerged buoy 204. The submerged buoy 204 comprises an acoustic receiver 632 which receives the acoustic signals, and which translates the acoustic signals into commands to drive the winch 602. Much like winch 402, winch 602 need not be sized to carry the entire subsurface load. That is, because of the load carrying distribution between the submerged buoy 206 and the surface buoy 204, the winch 602 may be of significantly smaller size than a winch designed to support the entire subsurface load.

In yet still further cases, the commands received by the surface buoy 204 regarding control of the winch 602 may be relayed to the submerged buoy 206 by way of the line 300. In particular, in these embodiments the line 300 is a cable that comprises not only a load carrying member (e.g., a steel cable, fiber cable, rope) but also comprises a conductor, distinct from the load carrying member, upon which messages may be communicated between the surface buoy 204 and the submerged buoy 206. The conductor may take any suitable form, such as one more electrical conductors, one or more optical conductors, or combinations. Thus, remotely sourced commands regarding length of the line 300 may be received by the surface buoy 204 by way of the communication system represented by antenna 410, and relayed to the submerged buoy 206 over the conductor(s) of the of the line 300.

FIG. 6 also shows that in some embodiments the submerged buoy 206 may have an associated electrical generator 640 turned by water movement past the buoy. The electrical generator 640 may provide power to operate the winch 602, or the power may be conducted to the surface buoy 204 by way of the line 300 to operate the winch 402. The power generated by the electrical generator 640 may serve any useful purpose, such charging batteries, or providing power to operate the acoustic communication system.

FIG. 7 shows a cross-sectional view of a line 300 in accordance with at least some embodiments. In particular, illustrative line 300 of FIG. 7 shows a conductor 700 disposed at the center of the line 300. The conductor 700 may be a single fiber optic conductor, two or more fiber optic conductors, a single electrical conductor, two or more electrical conductors, and combinations. The line 300 further comprises a plurality of load carrying members 702 (only two of which are specifically labeled). In the illustrative embodiments of FIG. 7, the load carrying members 702 surround the conductor 700, but in other cases the conductor 700 may be physically (though not necessarily electrically) exposed on an outer surface of the line 300, or wrapped around the load carrying members 702. Other designs may be used.

Here again, a winch with a line coupled between the surface buoy 204 and the submerged buoy 206 enables a configuration of the buoy system 202 that reduces complexity during deployment of the buoy system 202 in a marine environment. That is, the illustrative winch 602 enables not only a configuration where the distance between the surface buoy 204 and the submerged buoy 206 is limited by the length of line deployed from the winch, but also enables a configuration where the surface buoy 204 abuts submerged buoy 206 (as discussed with respect to FIG. 5).

Figure 8:
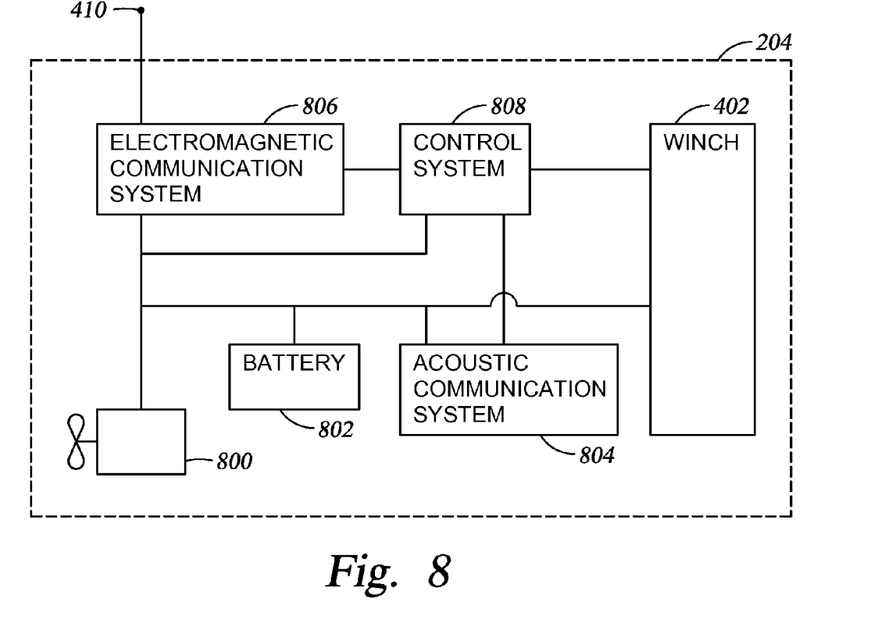
FIG. 8 shows an electrical block diagram in accordance with at least some embodiments.

FIG. 8 shows an electrical block diagram of the surface buoy 204 in accordance with at least some embodiments. In particular, FIG. 8 shows a generator 800, battery system 802, acoustic communication system 804, electromagnetic communication system 806, control system 808, and winch 402. Electrical generator 800 may electrically couple to all the other electrical components in the buoy 204. The electrical generator 800 produces electrical power based on water movement caused by towing the buoy 204 through the water. The electrical power produced may be used for a variety of systems in the buoy 204. For example, the electrical power produced may charge battery system 802, provide operational power to the acoustic communication system 804, provide operational power for the electromagnetic communication system 806, provide electrical power for the control system 808, and provide electrical power for the winch 402. In some cases, the electrical generator 800 may be omitted, and power provided solely from battery system 802, or provided from the submerged buoy by way of the line 300.

Battery system 802 may provide power to the operational components during periods of time when the buoy 204 is not moving through the water, or may provide the balance of operational power when the power draw is greater than the generation capacity of the electrical generator 800. Any suitable battery or set of batteries may be used for battery system 802, such as one more lead-acid batteries.

The acoustic communication system 804 may be used to communicate with the submerged buoy 206. For example, in situations where the submerged buoy 206 houses the winch, remotely sourced instructions regarding length of the line 300, and thus the depth of the submerged buoy 206, may be received by the surface buoy 204 and conveyed to the submerged buoy 206 by way of the acoustic communication system 804.

Electromagnetic communication system 806 may couple to the antenna 410. The electromagnetic communication enabled by the system 806 may be point-to-point electromagnetic communications, satellite based communications, line-of-sight optical communications, or combinations. The electromagnetic communication system 806 may not only receive instructions from remote locations (e.g., tow vessel or another survey vessel), but may also send communications as appropriate (e.g., remaining life of the battery system 802, length of the line 300 spooled from the winch 402). In some cases, the electromagnetic communication system 806 may have a control interface section to enable direct control of devices. For example, the electromagnetic communication system 806 may have relay controlled outputs that can control starting and stopping of other devices, such as winch 402.

Control system 808, from a control and communication standpoint, illustratively couples to the electromagnetic communication system 806, acoustic communication system 804, and winch 402. The control system 808 may be of any suitable construction. For example, the control system 808 may be: a control system constructed of discrete relays; a logic controller (e.g., a programmable logic controller (PLC) device); or a computer system programmed to receive input commands (e.g. from the electromagnetic communication system 806). The control system 808 may receive commands from remote devices over the electromagnetic communication system 806, and may take appropriate actions such as relaying the commands to the acoustic communication system 804 and/or controlling winch 402.

Before proceeding it should be noted that various components illustrated in FIG. 8 may be omitted depending on the particular buoy system 202. For example, winch 402 may be omitted if the winch for the buoy system 202 is implemented in the submerged buoy 206. Likewise, the acoustic communication system 804 may be omitted if the winch is implemented in the surface buoy 204, as in such situations there may not be a need for communication between the buoys. In systems where the winch is implemented in the submerged buoy, the amount of power draw may be sufficiently low that battery system 802 can carry sufficient charge to run the electromagnetic communication system 806 and acoustic communication system 804, and thus electrical generator 800 may be omitted. Many variations are possible based on the particular buoy system 204 arrangement. In fact, in systems where the winch 402 is a manually operated, all the various electrical systems may be omitted.

Figure 9:
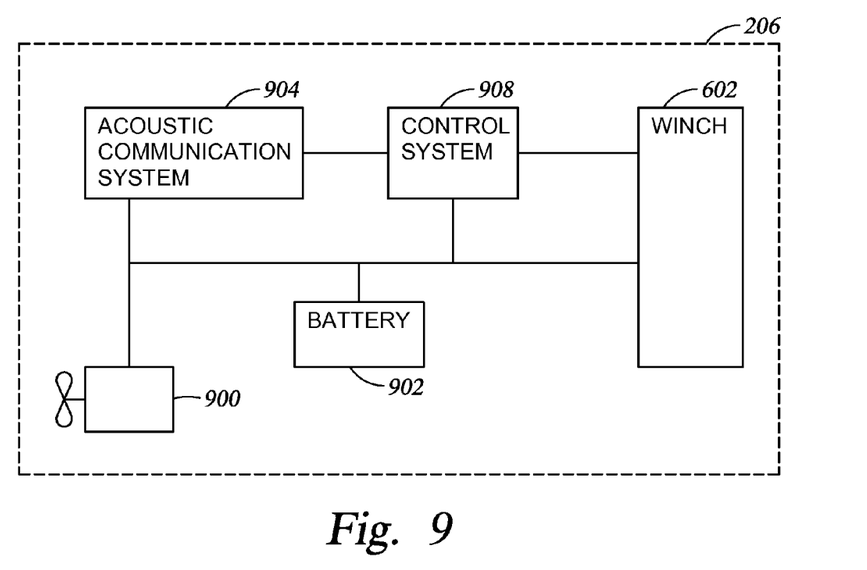
FIG. 9 shows an electrical block diagram in accordance with at least some embodiments.

FIG. 9 shows an electrical block diagram of the submerged buoy 206 in accordance with at least some embodiments. In particular, FIG. 9 shows a generator 900, battery system 902, acoustic communication system 904, control system 908, and winch 602. Electrical generator 900 may electrically couple to all the other electrical components in the buoy 206. The electrical generator 900 produces electrical power based on water movement caused by towing the buoy 206 through the water. The electrical power produced may be used for a variety of systems in the buoy 206. For example, the electrical power produced may charge battery system 902, provide operational power to the acoustic communication system 904, provide electrical power for the control system 908, and provide electrical power for the winch 602. In some cases, the electrical generator 900 may be omitted, and power provided from battery system 902 or from the surface buoy 204 by way of line 300.

Battery system 902 may provide power to the operational components during periods of time when the buoy 206 is not moving through the water, or may provide the balance of operational power when the power draw is greater than the generation capacity of the electrical generator 900. Any suitable battery or set of batteries may be used for battery system 902, such as one more lead-acid batteries.

The acoustic communication system 904 may be used to communicate with the surface buoy 204. For example, in situations where the submerged buoy 206 comprises the winch, instructions regarding length of the line 300, and thus the depth of the submerged buoy 206, may be received by the surface buoy 204 and conveyed to the submerged buoy 206 by way of the acoustic communication system 908.

Control system 908, from a control and communication standpoint, couples to acoustic communication system 904 and winch 602. The control system 908 may be of any suitable construction. For example, the control system 908 may be: a control system constructed of discrete relays; a logic controller (e.g., a programmable logic controller (PLC) device); or a computer system programmed to receive input commands (e.g. from the acoustic communication system 904). The control system 908 may receive commands and may take appropriate actions, such as controlling winch 402.

Before proceeding is should be noted that the various components illustrated in FIG. 9 may be omitted depending on the particular system set up. For example, in systems where the winch is located in the surface buoy 204, all the components illustrated in FIG. 9 may be omitted. In systems where the amount of power draw may be sufficiently low that battery system 902 can provide sufficient electrical current, electrical generator 900 may be omitted. In some cases, electrical power generated by the generator 800 in the surface buoy may be conveyed to the submerged buoy 206 by way of line 300, and in such cases the electrical generator may be omitted.

Figure 10:
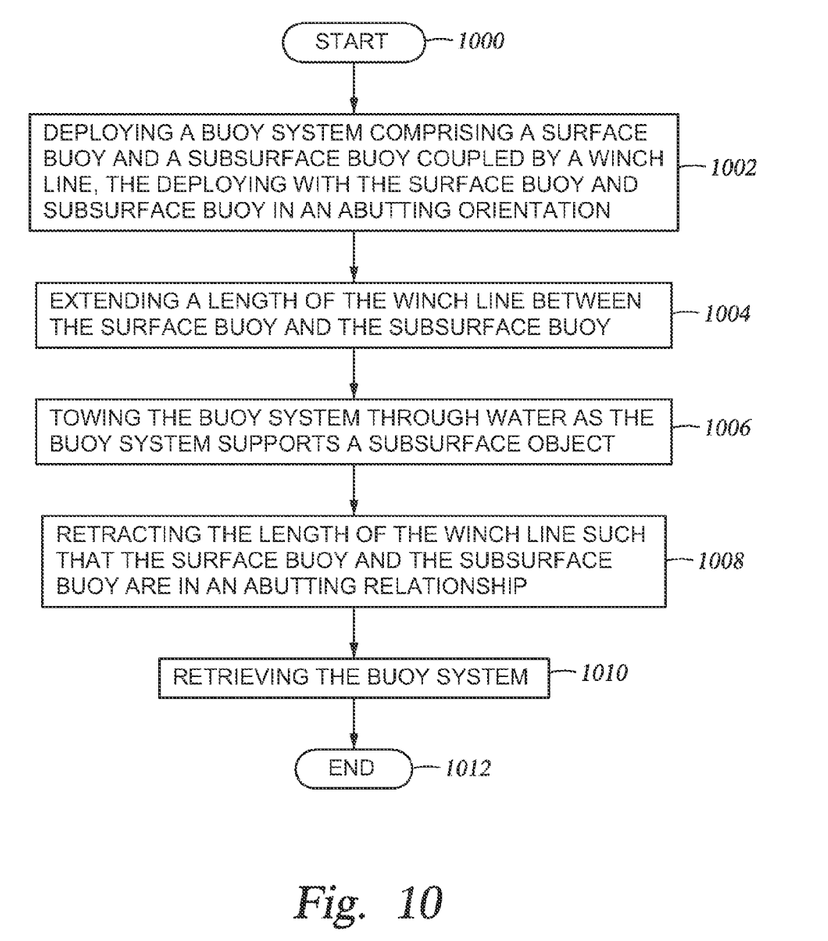
FIG. 10 shows a method in accordance with at least some embodiments.

FIG. 10 shows a method in accordance with at least some embodiments. In particular, the method starts (block 1000) and comprises: deploying a buoy system comprising a surface buoy and a submerged buoy coupled by winch line, the deploying with the surface buoy and submerged buoy in an abutting orientation (block 1002); extending a length of the wench line between the surface buoy and the submerged buoy (block 1004); towing the buoy system through water as the buoy system supports a subsurface object (block 1006); retracting the length of the wench line such that the surface buoy and the submerged buoy are in an abutting relationship (block 1008); and then retrieving the buoy system (block 1010). Thereafter, the method ends (block 1012).

In a particular embodiment, deploying the buoy system comprises moving the buoy system from the deck of a vessel to the water, such as by a crane. It follows that retrieving the buoy system may comprise removing the buoy system from the water and placing the buoy system on the deck of the vessel, again possibly by use of a crane. In some embodiments, extending the length of winch line between the surface buoy and the submerged buoy further comprises sending a message wirelessly to the surface buoy, where the message contains an instruction to extend the length of the winch line. Likewise, retracting the length of the winch line may comprise sending a message wirelessly to the surface buoy, where the message contains an instruction to retract the length of the winch line. In a particular embodiment, extending the winch line further comprises sending a message acoustically between the surface buoy and the submerged buoy to extend the length of the line. Likewise, retracting the length of the winch line may comprise sending a message acoustically between the surface buoy and the submerged buoy to extend the length of the line.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment The above discussion is meant to be illustrative of the principles and various embodiments of the present invention. Numerous variations and modifications will become apparent to those skilled in the art once the above disclosure is fully appreciated. For example, a safety line may extend between the surface buoy 204 and the submerged buoy 206 as a safety backup in case the line 300 breaks. It follows that the safety line be slightly longer than an expected longest length of the line 300. Further, the submerged buoy may comprise an air bag system that deploys based on depth (pressure) to prevent loss of the submerged buoy (and subsurface load) in the event of catastrophic failure. It is intended that the following claims be interpreted to embrace all such variations and modifications.

What is claimed is:

1. A buoy system comprising:
a surface buoy;
a subsurface buoy comprising an elongated outer body, the elongated outer body defining an upper surface and a lower surface;
a connector disposed on the lower surface, the connector configured to couple to a sensor streamer; and
a winch having a line, the line coupled between the surface buoy and the upper surface of the subsurface buoy;
wherein the buoy system has a first configuration in which the upper surface of the subsurface buoy abuts the surface buoy during deployment, the abutting relationship held by tension in the line, and the buoy system has a second configuration where a distance between the surface buoy and the subsurface is limited by a length of the line spooled off the winch.

2. The buoy system of claim 1 further comprising an electromagnetic communication system associated with the surface buoy, and wherein the surface buoy is configured to control the winch based on messages received by the electromagnetic communication system.

3. The buoy system of claim 1 wherein the displacement of the surface buoy and the subsurface buoy is configured such that for an expected subsurface load to be carried by the buoy system, the subsurface buoy is configured to submerge and the surface buoy is configured to reside on the surface.

4. The buoy system of claim 1 wherein for an expected subsurface load to be carried by the buoy system, the subsurface buoy is configured to support more than 75% of the expected subsurface load.

5. The buoy system of claim 1 wherein for an expected subsurface load to be carried by the buoy system, the subsurface buoy is configured to support more than 85% of the expected subsurface load.

6. The buoy system of claim 1 wherein the surface buoy has a displacement less than the subsurface buoy.

7. The buoy system of claim 1 wherein the winch is located within a cavity defined in the surface buoy, and the line couples to the subsurface buoy.

8. The buoy system of claim 1 wherein the winch is located within a cavity defined in the subsurface buoy, and the line couples to the surface buoy.

9. The buoy system of claim 8 wherein the line further comprises a cable comprising a conductor distinct from a load carrying member, the conductor configured to carry communication signals.

10. The buoy system of claim 9 further comprising:
an acoustic transmitter coupled to the surface buoy;
an acoustic receiver coupled to the subsurface buoy and configured to receive signals from the surface buoy by way of the acoustic transmitter.

11. The buoy system of claim 1 wherein the length of line spooled off the winch is set such that the depth of the subsurface buoy reduces mechanical motion imparted to the subsurface buoy by the surface buoy.

12. The buoy system of claim 1 further comprising:
a sensor streamer having a plurality of sensors spaced along the sensor streamer; and
a line that defines a first end and a second end, the first end coupled to the connector, and the second end coupled to the sensor streamer.

13. A method comprising:
deploying a buoy system comprising a surface buoy and a subsurface buoy coupled by winch line, the deploying with the surface buoy and subsurface buoy in an abutting orientation and the subsurface buoy coupled to a sensor streamer; and then
extending a length of the winch line between the surface buoy and the subsurface buoy;
towing the buoy system through water as the buoy system supports the sensor streamer;
retracting the length of the winch line such that the surface buoy and the subsurface buoy are in an abutting relationship; and then
retrieving the buoy system.

14. The method of claim 13 wherein extending the length of the winch line further comprises sending a message wirelessly to the surface buoy to extend the length of winch line.

15. The method of claim 13 wherein retracting the length of the winch line further comprises sending a message wirelessly to the surface buoy to retract the length of winch line.

16. The method of claim 13 wherein extending further comprises sending a message acoustically between the surface buoy and the subsurface buoy to extend the length of winch line.

17. The method of claim 13 wherein extending further comprises sending a message acoustically between the surface buoy and the subsurface buoy to retract the length of winch line.

18. A marine survey system comprising:
a survey vessel;
a plurality of sensor streamers coupled to the survey vessel by at least one line, each sensor streamer defining a proximal portion closest to the survey vessel, and a distal portion;
a plurality of sensors associated with each of the plurality of sensor streamers;
a plurality of buoy systems coupled one each to the proximal portion of each of the plurality of sensor streamers, each buoy system comprising:
a surface buoy at a surface of the water;
a submerged buoy comprising an elongated outer body, the elongated outer body defines an upper surface and a lower surface, the submerged buoy below the surface of the water;
a connector disposed on the lower surface, the connector coupled to an associated sensor streamer; and
a winch having a line, the line coupled between the surface buoy and the submerged buoy;
wherein the buoy system has first configuration in which the upper surface of the submerged buoy abuts the surface buoy during deployment, the abutting relationship held by tension in the line, and the buoy system has a second configuration where a distance between the surface buoy and the submerged buoy is limited by a length of the line spooled off the winch.

19. The buoy system of claim 18 further comprising an electromagnetic communication system associated with the surface buoy, and wherein the surface buoy is configured to control the winch based on messages received by the electromagnetic communication system.

20. The buoy system of claim 18 wherein the winch is located within a cavity defined in the surface buoy, and the line couples to the upper surface of the submerged buoy.

21. The buoy system of claim 18 wherein the winch is located within a cavity defined in the submerged buoy, and the line couples to the surface buoy.

22. The buoy system of claim 21 wherein the line further comprises a cable comprising a conductor distinct from a load carrying member, the conductor configured to carry communication signals.

23. The buoy system of claim 21 further comprising:
an acoustic transmitter coupled to the surface buoy;
an acoustic receiver coupled to the submerged buoy and configured to receive signals from the surface buoy by way of the acoustic transmitter.

* * * * *